Figure 1:
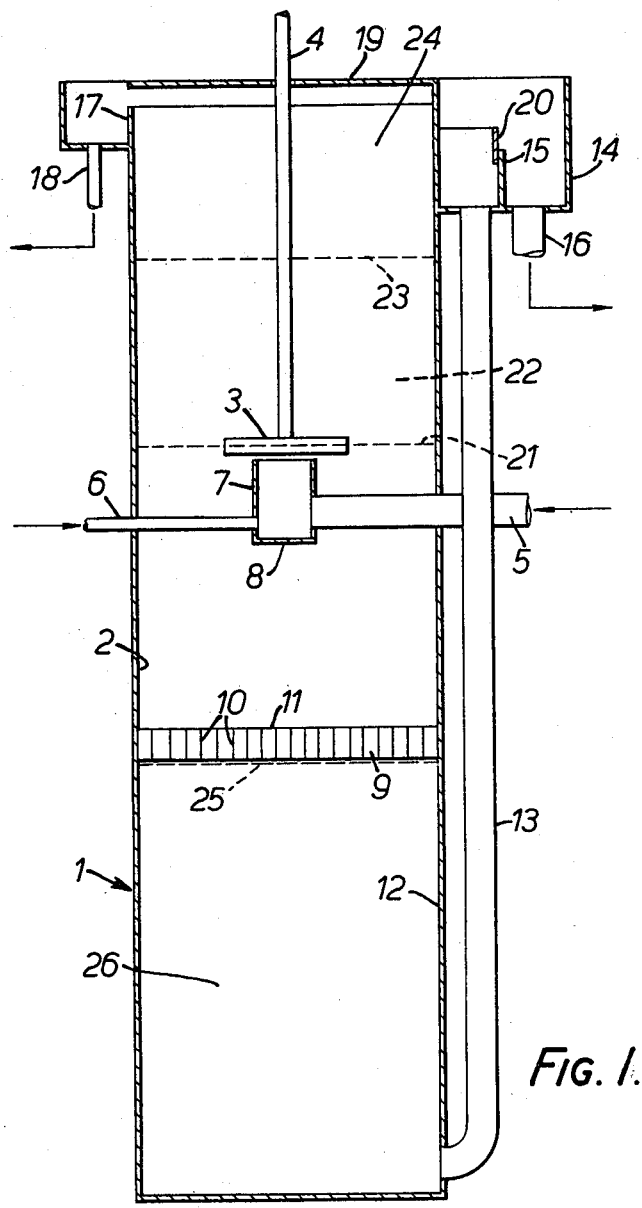

United States Patent [19]

Jackson et al.

[11] 4,391,711

[45] Jul. 5, 1983

[54] METHOD OF, AND APPARATUS FOR, EFFECTING LIQUID-LIQUID CONTACT

[75] Inventors: Ian D. Jackson; Derek Berry; George A. Rowden, all of Stockton-on-Tees; Malcolm Dilley, Middlesbrough, all of England

[73] Assignee: Davy McKee (Minerals & Metals) Limited, Stockton-on-Tees, England

[21] Appl. No.: 245,591

[22] Filed: Mar. 19, 1981

[30] Foreign Application Priority Data

Mar. 19, 1980 [GB] United Kingdom ............. 8009180

[51] Int. Cl.³ ........................................... B01D 11/04
[52] U.S. Cl. .................................. 210/634; 23/306; 210/511; 210/540; 366/177; 422/259
[58] Field of Search ............... 422/258, 259; 209/169, 209/170; 23/306; 261/93; 210/634, 638, 511, 532.1, 538, 540; 366/177, 182

[56] References Cited

U.S. PATENT DOCUMENTS

| | | | |
|---|---|---|---|
| 2,176,899 | 10/1939 | Gordon et al. | 422/259 X |
| 2,850,362 | 9/1958 | Scheibel | 422/259 |
| 3,150,934 | 9/1964 | Hazard | 422/259 |
| 3,374,988 | 3/1968 | Eckert | 422/258 X |
| 3,408,051 | 10/1968 | McWhirter | 422/258 X |
| 3,536,453 | 10/1970 | Sokov et al. | 422/259 X |
| 3,779,907 | 12/1973 | Li et al. | 210/638 |
| 4,221,658 | 9/1980 | Hardwick | 422/259 X |
| 4,268,484 | 5/1981 | Gavin | 422/259 |
| 4,277,445 | 7/1981 | DeSchepper et al. | 422/259 |

FOREIGN PATENT DOCUMENTS 730027  3/1966  Canada ................. 422/258

Primary Examiner—Richard L. Chiesa
Attorney, Agent, or Firm—Bernard, Rothwell & Brown

[57] ABSTRACT

An apparatus and method for effecting liquid-liquid contact between an aqueous liquid medium and an organic liquid medium comprises a chamber for holding a body of each of the media having an agitator therein. One or both of the media are supplied to a mixing zone around the agitator. By means of the agitator a dispersion band is formed with a free space above and/or below it which is devoid of baffles. A layer of disengaged lighter medium forms above the dispersion band and a layer of disengaged heavier medium below it, at least one of these layers extending into the or a corresponding free space. Disengaged lighter and/or heavier medium is recovered from the corresponding layer thereof at the same rate that it is supplied to the mixing zone.

13 Claims, 3 Drawing Figures

METHOD OF, AND APPARATUS FOR, EFFECTING LIQUID-LIQUID CONTACT

This invention relates to a method and apparatus for effecting liquid-liquid contact.

In West German Offenlegungsschrift No. 2807129 and in U.S. Pat. No. 4,221,658 there has been described a method and apparatus for effecting liquid-liquid contact in which an aqueous liquid medium and an organic hydrophobic liquid medium capable of undergoing mass transfer one with another are fed to a mixing chamber above and below which are provided respective upper and lower settling chambers, separated from the mixing chamber by means of upper and lower baffled zones, which allow settling conditions to be maintained in the settling chambers despite turbulent mixing conditions in the mixing chamber. Conveniently weirs are used to control the outflow of the disengaged media from the apparatus. The heights of the weirs and the relative densities of the media determine the position of the static interface between the media (i.e. the interface formed when the impeller or other mixing device is not operating) and hence the volume ratio of the media in the mixing chamber. By withdrawing disengaged lighter and heavier media from the disengaged layers thereof that are formed respectively in the upper and lower settling chambers, each at a rate substantially equal to the rate of feed thereof to the mixing chamber, the volume ratio of the media in the dispersion in the mixing chamber can be maintained at a substantially constant predetermined value independently of the ratio of the feed rates of the liquid media to the mixing chamber.

A form of apparatus for effecting liquid-liquid contact in a plurality of stages which operates according to similar principles is disclosed in European Patent Publication No. 0008189 and in U.S. Pat. Nos. 4,268,484 and 4,292,277.

In the apparatus of both of these prior proposals the baffled zones define the upper and lower boundaries of the mixing chamber. These baffled zones are each provided with a plurality of flow paths therethrough which allow liquid, whether in the form of a dispersion or of a disengaged phase, to pass from the mixing chamber to the settling chamber and vice versa. In operation of the apparatus dispersion flows upwards into the upper baffled zone whilst a corresponding amount of wholly or partially disengaged heavier medium returns to the mixing chamber therefrom; similarly dispersion flows downwardly into the lower baffled zone whilst a corresponding volume of wholly or partially disengaged lighter medium flows back into the mixing chamber therefrom. A function of the baffled zones is to eliminate substantially all swirling motion of the dispersion in the mixing chamber about the axis of the impeller from liquid entering the settling chamber on the other side of the baffled zone from the mixing chamber. In this way the baffled zones help to maintain settling conditions in the upper and lower settling chambers. This swirling movement of the dispersion in the mixing chamber results in viscous drag being exerted in the dispersion in the vicinity of the baffled zones in the moving chamber. This viscous drag increases the power input that is required. Additionally the baffled zones add to the complexity of construction of the apparatus and hence its expense.

It would accordingly be desirable to simplify the apparatus of the prior proposals and to provide an improved form of apparatus that is cheaper to construct and has a lower power requirement than that prior proposal.

It is accordingly an object of the present invention to provide a simplified method of effecting liquid-liquid contact and an improved form of liquid-liquid contact apparatus.

According to the invention there is provided a method of effecting liquid-liquid contact between an aqueous liquid medium and an organic hydrophobic liquid medium capable of undergoing mass transfer with the aqueous medium, comprising:

providing a chamber containing a body of each of the aqueous and organic liquid media;

agitating the liquid media within a mixing zone in the chamber so as to form a dispersion band which contains a dispersion of droplets of one of the media dispersed within the other, the droplets of dispersed medium being of a size such that upon standing under gravity the dispersion will substantially completely disengage into two separate liquid layers, the volume ratio of the media in the dispersion band corresponding substantially to a selected value, and the mixing zone being disposed within the chamber with a free space that is devoid of baffles above and/or below the mixing zone so that there are formed above and below the dispersion band respectively an upper layer of lighter medium and a lower layer of heavier medium, at least one of which layers extends at least partially into the or a corresponding free space;

supplying at least one of the aqueous and organic liquid media to the mixing zone at a respective preselected feed rate;

allowing disengaged lighter and heavier media to pass from the dispersion band to the upper and lower layers respectively; and recovering disengaged lighter and/or heavier medium from the upper and/or lower layer respectively at a rate in each case substantially equal to the rate of supply of that medium to the mixing zone, thereby to maintain the volume ratio of the media in the dispersion band substantially at the selected value.

The invention further provides apparatus for effecting liquid-liquid contact between an aqueous liquid medium and an organic hydrophobic liquid medium capable of undergoing mass transfer with the aqueous medium, comprising:

A chamber for holding a body of each of the aqueous and organic liquid media;

agitator means within the chamber for agitating the liquid media in a mixing zone so as to form a dispersion band which contains a dispersion of droplets of one of the media dispersed within the other, the droplets of dispersed medium being of a size such that upon standing under gravity the dispersion will substantially completely disengage into two separate liquid layers, the mixing zone being disposed within the chamber with a free space above and/or below it that is devoid of baffles such that an upper layer of disengaged lighter medium may form above the dispersion band whilst a layer of disengaged lower medium may form below the dispersion band with at least one of these layers extending at least partially into the or a corresponding free space;

means for supplying at least one of the aqueous and organic liquid media to the mixing zone; and means for recovering from the chamber lighter and-/or heavier medium from the upper and/or lower layer respectively at a rate in each case substantially equal to the rate of supply of that medium to the mixing zone.

In the practice of the invention it is preferred to position the agitator means within the chamber so that this lies at or in the vicinity of the static interface between the media (i.e. the interface between the media when the agitator means is not operating).

The invention requires that, when the chamber contains appropriate working quantities of the liquid media to be contacted, there is a free space above and/or below the mixing zone and that at least one of the layers of disengaged media extends into the or a corresponding free space. The shape and size of the mixing zone will be determined largely by the design of the agitator means and by the shear forces exerted by it in operation, but may be influenced also by the transverse dimensions of the chamber since the walls of the chamber may distort the natural shape of the mixing zone. (By the term "natural shape of the mixing zone" we mean the shape that the mixing zone would take if the impeller were rotated at the chosen speed at the interface between two bodies of the liquid media, each of the same depth as those of the working quantities used in the chamber, but each of essentially infinite volume). Usually it will be preferred to design the chamber so that its transverse dimensions are equal to or less than the transverse dimensions of the "natural shape of the mixing zone" but are not so small as to give rise to an inconvenient depth of dispersion band. The depth of the mixing chamber must of course be sufficient to allow the free space or spaces to be present, as required, above and/or below the dispersion band.

In the practice of the invention the ratio of the media in the mixing zone preferably lies in the range of from about 5:1 to about 1:5 by volume; even more preferably this ratio is about 1:1 by volume. However, when using continuous feeds of the two media the ratio of the rates of supply of the two media may differ from the first mentioned ratio and may lie, for example, in the range of from about 100:1 to about 1:100 by volume.

The invention envisages the use of chambers without any baffles as well as those with one baffle only; in this latter case the baffle may be disposed above or below the mixing zone.

The invention is of applicability to any liquid-liquid extraction process. Thus the aqueous medium may be the lighter medium or the heavier medium depending on the specific gravity of the organic hydrophobic medium. For example, if the organic medium is a chloroform solution, the aqueous medium will be the lighter medium. If, however, the organic medium is, for example, a hydrocarbon solution, then the aqueous medium will be the heavier medium.

In the practice of the invention it is possible to feed one medium only to the mixing zone or both. An example of a process wherein one medium only is supplied to the mixing zone is a process wherein a dispersion containing droplets of a first liquid dispersed in a second liquid (e.g. an oil-contaminated water), the droplets including droplets too small to settle out solely under the influence of gravity, is fed continuously to the mixing zone of a chamber containing a body of the first liquid (e.g. oil), whilst recovering from the corresponding layer of disengaged phase in the chamber second liquid (e.g. water) now depleted in droplets of the first liquid. In this process coalescence of the small droplets of oil that are too small to settle out solely under the influence of gravity is enhanced by collision in the dispersion with the larger droplets of oil formed by the agitator in the mixing zone. As examples of processes in which both phases are supplied to the mixing zone there can be mentioned as typical examples metallurgical solvent extraction processes (e.g. uranium and copper extraction), petroleum refinery operations (e.g. caustic extraction of sulphur compounds from gasoline), and pharmaceutical processes (e.g. antibiotic recovery).

By the term "medium" we mean to embrace not only solutions and dispersions of solids in a continuous liquid phase but also emulsions of the oil-in-water and water-in-oil type (as the case may be), particularly emulsions of the type utilised in the so-called "liquid membrane" extraction process. Further details of this "liquid membrane" process and teaching as to the formulation of suitable emulsions for use therein can be obtained, for example, from U.S. Pat. No. 3,779,907.

Figure 2:
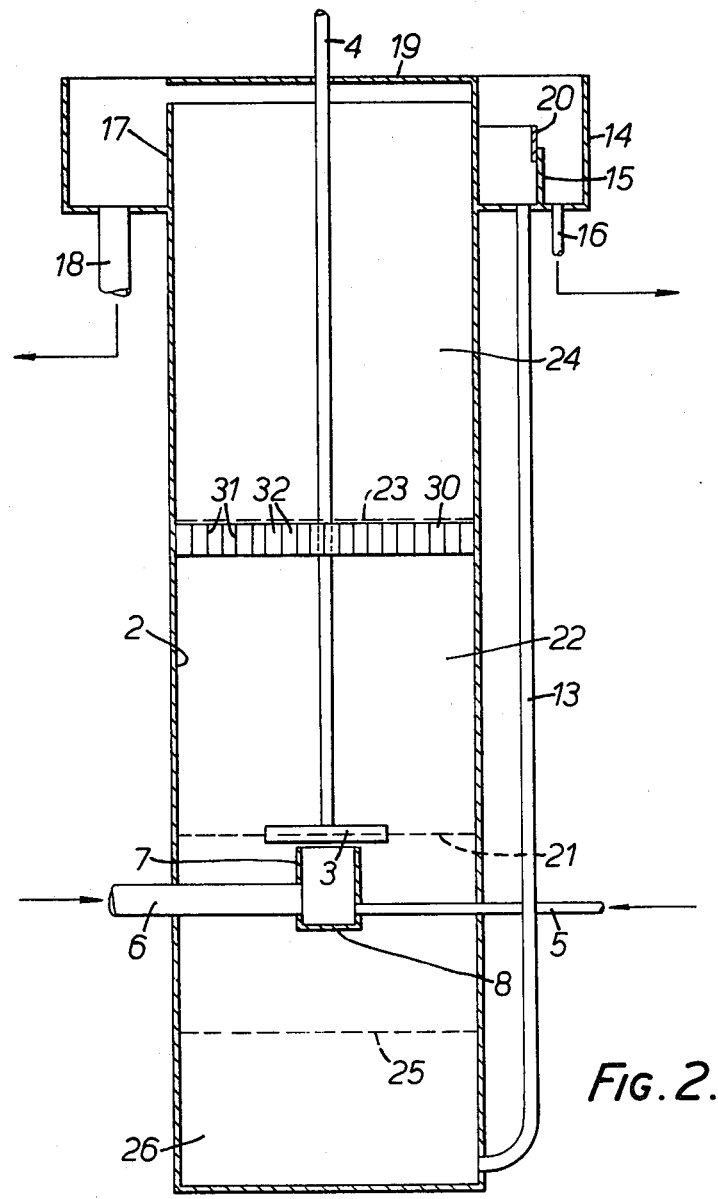
Figure 3:
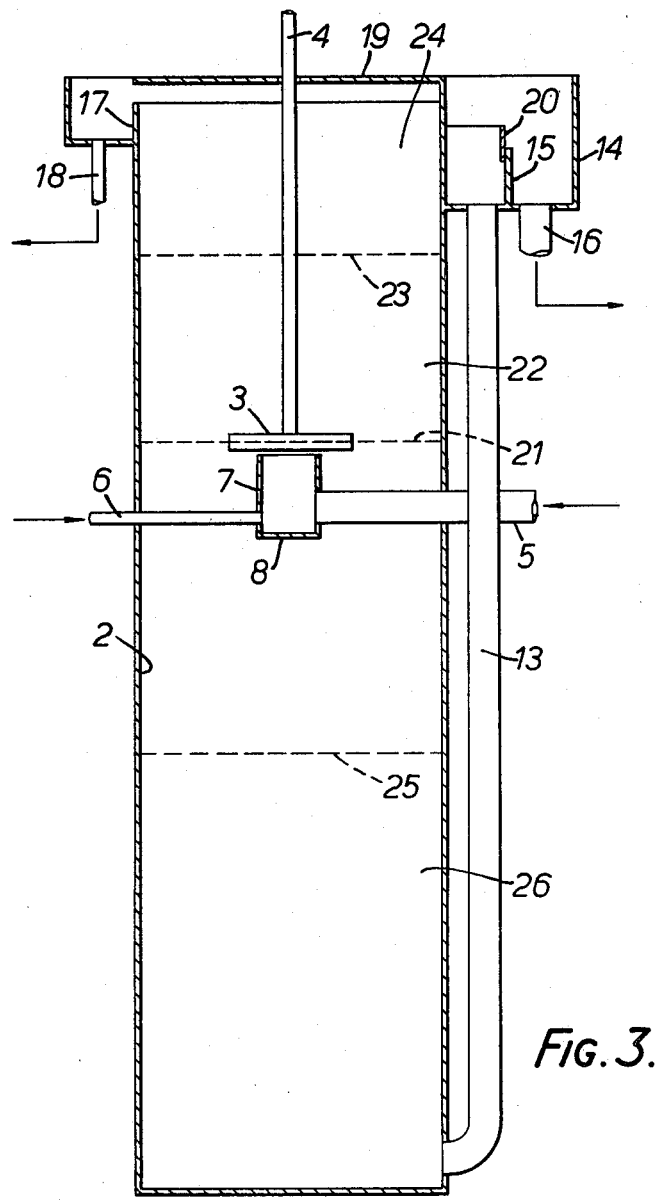

In order that the invention may be clearly understood and readily carried into effect some preferred processes, and apparatus suitable for use therein, will now be described, by way of example only, with reference to the accompanying drawings, wherein:

FIGS. 1 to 3 are each vertical sections through different forms of single stage liquid-liquid extraction apparatus according to the invention.

Referring to FIG. 1 of the drawings, a mixer-settler 1 comprises a chamber 2 of substantially circular cross section whose height is greater than its diameter. An impeller 3 is mounted within chamber 2 on a vertical shaft 4 which is driven by a suitable motor (not shown), if necessary via reduction gearing. An inlet pipe 5 is provided for the heavier medium, whilst inlet pipe 6 serves to feed lighter medium to chamber 2. Each inlet pipe 5, 6 is connected to a draught tube 7 in the form of an open-topped drum of substantially circular cross-section whose bottom is indicated at 8. Beneath draught tube 7 is mounted an "egg box" baffle 9; this consists of two sets of vertical plates 10, 11 welded or otherwise secured one to another at right angles so as to form a plurality of vertical passageways for liquid extending from top to bottom of baffle 9. Beneath baffle 9 is a lower chamber 12 from which pipe 13 leads to an outlet box 14 which is provided with a weir 15 and with an outlet pipe 16 on the opposite side of weir 15 from pipe 13. A weir 17 is provided at the top of mixer-settler 1; pipe 18 provides an outlet for liquid overflowing weir 17. Reference numeral 19 indicates a top cover for the mixer-settler 1 which helps to reduce the fire hazard. The height of weir 15 can be varied by vertical adjustment of movable plate 20.

In operation the heavier medium is supplied via inlet pipe 5 at a greater rate than the rate of supply of the lighter medium via inlet pipe 6. (If the process demands that the lighter medium be provided in excess, then it is supplied via inlet pipe 5 whilst the heavier medium is supplied via inlet pipe 6). Supposing, for example, that the apparatus of FIG. 1 is being used for uranium extraction, then the heavier medium may be a pregnant uranium leach liquor (e.g. a sulphuric acid leach solution) whilst the lighter medium is an organic extractant phase (e.g. a 5% by volume "Alamine 336" solution in kerosene/2.5% by volume iso-decanol) and is supplied via inlet pipe 6 at approximately one tenth the rate of supply of the pregnant uranium leach liquor via inlet pipe 5. (The word "Alamine" is a trade mark).

Prior to starting the drive motor for impeller 3, with the two media flowing at the desired rates, the height of weir 15 is adjusted in relation to that of weir 17 and in relation to the bottom of the chamber 2 so that the static interface 21 between the media lies at a depth in the vicinity of the impeller 3. In this way, when impeller 3 is rotated an approximately 1:1 by volume dispersion is formed.

When impeller 3 is rotated about the axis of shaft 4 the liquid media are dispersed one within the other within a mixing zone surrounding the impeller and a dispersion band 22 is formed whose upper boundary is indicated diagrammatically at 23. Above the upper boundary 23 of dispersion band 22 there separates out a layer 24 of disengaged lighter medium. This overflows weir 17 at a rate substantially equal to the rate at which the lighter medium is supplied through inlet pipe 6.

The lower boundary of dispersion band 22 is indicated diagrammatically at 25 below which a layer 26 of disengaged heavier medium separates out. Disengaged heavier medium flows up pipe 13, over weir 15 and out through outlet pipe 16 at a rate substantially equal to the rate of supply of heavier medium through inlet pipe 5.

The weirs 15, 17 permit a substantially constant volume ratio of the media to be maintained in the dispersion band 22 whatever the ratio of the feed rates of the media to the mixing zone. Hence a temporary interruption in the supply of one or other of the media to the mixing zone does not have any substantial effect on the volume ratio of the media in the dispersion band.

In the apparatus of FIG. 1 it is of course essential that the impeller 3 lies at a sufficient depth below the level of weir 17 and above the bottom of chamber 2 that the layers 24, 26 of disengaged media can form above and below the dispersion band 22 respectively. Hence impeller 3 must be positioned at an appropriate depth below the top of weir 17 and above the bottom of chamber 2.

The design and rate of rotation of impeller 3 are so selected that shear conditions favourable for forming a so-called "primary" dispersion prevail in the mixing zone in the vicinity of impeller 3. In such a "primary" dispersion the droplets of dispersed medium are of a size, typically larger than about 100 micrometers in diameter, such that simply on standing under gravity the dispersion separates into its two constituent media. The formation of "secondary" dispersions, which is usually favoured by excessive shear rates, is to be avoided. Such "secondary" dispersions do not disengage under gravity and contain smaller droplets of dispersed medium than those of "primary" dispersions, typically about 20 micrometers in diameter or less.

Although the upper and lower boundaries of the dispersion band have been shown as level interfaces, in practice these boundaries may be ruffled by wave-like ripples due to turbulent mixing conditions set up in the dispersion band by the impeller 3.

At start up it may be expedient to interrupt temporarily the flow of one of the media and to siphon out some of one of the media so as temporarily to shift the interface 21 up or down sufficiently to ensure that a dispersion with the desired continuity is formed.

Impeller 3 may be of any suitable design, for example it may be of the pump-mix type, of the marine impeller type, or of the turbine type. It is, however, preferred to use a modified form of double-shrouded pump-mix impeller with an open "eye" in its lower face, particularly when a draught tube such as the draught tube 7 is provided for inlet of the phase or phases supplied to the apparatus, the upper end of which draught tube is positioned under and adjacent the open "eye" of the impeller.

The inlet pipe for the lighter medium, whether this is the inlet pipe 5 or the inlet pipe 6, may if desired be extended within draught tube 7 and its end may be upturned so that this lies just under impeller 3.

In a modification of the apparatus of FIG. 1 the baffle 9 is replaced by a pad of "Knitmesh DC". This is a dual filament knitted mesh fabric knitted from side-by-side filaments of, for example stainless steel and polypropylene. In an alternative embodiment baffle 9 is made of plates welded one to another so as to form, in place of the square section vertical passageways illustrated, corresponding hexagonal or triangular passageways. Yet again baffles 9 can be replaced by an inclined plate baffle.

In FIGS. 2 and 3 the same reference numerals are used to indicate the same parts as described in relation to FIG. 1. The apparatus of FIG. 2 differs from that of FIG. 1 in that baffle 9 is omitted. Instead a baffle 30 constructed in similar fashion to baffle 9 from plates 31, 32 is positioned above impeller 3. The ligher medium is introduced via inlet pipe 6 whilst the heavier medium is fed via inlet pipe 5. The lighter medium is supplied at a higher rate than the heavier medium. The operation of the apparatus of FIG. 2 is similar to that of FIG. 1.

The apparatus of FIG. 3 is similar to that of FIGS. 1 and 2 but has no baffles. Its operation is similar to the operation of FIG. 1.

It will be appreciated by the skilled reader that the shear conditions prevailing in the dispersion band 22 are not uniform throughout the dispersion band. Within the mixing zone the liquids are subjected to intense mixing in the vicinity of the impeller 3 and any liquid entering this mixing zone is immediately mixed or re-mixed to form dispersion. As the dispersion moves away from the region of the impeller disengagement of the dispersion commences through drop-to-drop coalescence of the droplets of the dispersed medium. At the boundary between the dispersion band and the layer of the medium that forms the dispersed medium of the dispersion drop-to-bulk phase coalescence occurs and the medium that forms the continuous medium flows back into the dispersion band. At the opposite boundary of the dispersion band, that is to say at its boundary with the layer of the medium that forms the continuous medium of the dispersion, the continuous medium drains upwards or downwards as the case may be from the dispersion band into that layer. At the same time the droplets of dispersed phase at this boundary of the dispersion are fluidized by the flow of continuous phase to the continuous layer thereof and grow in size by drop-to-drop coalescence as they move back towards the mixing zone.

It will be appreciated that the description in the foregoing paragraph is idealised. In practice the flow of the media back into the mixing zones and to the continuous layers is influenced by localised disturbances which set up possibly irregular flow patterns in the dispersion band.

Although the apparatus of each of FIGS. 1 to 3 has been described as being of circular cross-section, it is possible to use chambers of other cross-sections, e.g. square or hexagonal.

The illustrated forms of apparatus are all single stage mixer-settlers. It is of course readily possible to adopt the teachings of the invention for multi-stage operation. For example, a plurality of the illustrated single stage mixer-settlers can be connected for countercurrent or co-current flow of the media. In another arrangement a rectangular tank is subdivided by transverse internal walls to form square section individual mixer-settler units otherwise similar to the apparatus of one of FIGS. 1 to 3. In either case the outflow pipes 16, 18 are connected to the inlet tubes 5, 6 of adjacent units in a countercurrent or co-current arrangement as desired. Flow of the media between the stages can be controlled by weirs and/or by valves.

It will be appreciated by those skilled in the art that the illustrated forms of apparatus are illustrative only and that it may in practice be desirable, in particular, to adopt a different height:diameter (or transverse dimension) ratio from that illustrated, depending largely upon the design throughput of the medium or media to be supplied to the apparatus. Phase disengagement at the interface between the dispersion band and the respective layer of the relevant disengaged medium requires that there be sufficient interfacial area at this boundary for this to occur completely at the relevant feed rate of the medium or media to the mixing zone. Hence for apparatus designed for large liquid throughputs it may be necessary to increase the cross sectional area of the chamber to allow successful phase disengagement to occur if the danger of flooding of the apparatus with dispersion is to be avoided. In other words it may be necessary to use smaller height:diameter (or transverse dimension) ratios, e.g. ratios of about 2:1, or even about 1:1, in particular cases.

We claim:

1. A method of effecting liquid-liquid contact between an aqueous liquid medium and an organic hydrophobic liquid medium capable of undergoing mass transfer with the aqueous medium, comprising:
   providing a chamber containing a body of each of the aqueous and organic liquid media;
   agitating the liquid media within a mixing zone in the chamber so as to form a dispersion band which contains a dispersion of droplets of one of the media dispersed within the other, the droplets of dispersed medium being of a size such that upon standing under gravity the dispersion will substantially completely disengage into two separate liquid layers, the volume ratio of the media in the dispersion band corresponding substantially to a selected value, and the mixing zone being disposed within the chamber with a free space that is devoid of baffles above and/or below the mixing zone so that there are formed above and below the dispersion band respectively an upper layer of lighter medium and a lower layer of heavier medium, at least one of which layers extends at least partially into the corresponding free space and so that dispersion can freely re-enter the mixing zone;
   supplying at least one of the aqueous and organic liquid media to the mixing zone at a respective preselected feed rate;
   allowing dispersion freely to re-enter the mixing zone;
   allowing disengaged lighter and heavier media to pass from the dispersion band to the upper and lower layers respectively; and
   recovering disengaged lighter and/or heavier medium from the upper and/or lower layer respectively at a rate in each case substantially equal to the rate of supply of that medium to the mixing zone, thereby to maintain the volume ratio of the media in the dispersion band substantially at the selected value.

2. A method according to claim 1, in which both of the aqueous and organic liquid media are supplied to the mixing chamber, each at a respective preselected feed rate, and in which both disengaged lighter medium and disengaged heavier medium are recovered from the upper and lower layer respectively, each at a rate substantially equal to the rate of supply of that medium to the mixing zone.

3. A method according to claim 2, in which the ratio of the feed rates of the liquid media to the mixing zone lies in the range of from about 100:1 to about 1:100 by volume.

4. A method according to any one of claims 1 to 3, in which the volume ratio of the media in the dispersion lies in the range of from about 5:1 to about 1:5.

5. A method according to claim 1, in which the step of recovering disengaged lighter and/or heavier medium from the upper and/or lower layer respectively includes allowing the or each medium to be recovered to overflow a respective weir.

6. A method according to claim 1 wherein the agitating is performed by rotating an impeller in the mixing zone, and wherein there is allowed free movement of liquid by the absence of baffles between at least one of the upper and lower layers and the impeller.

7. Apparatus for effecting liquid-liquid contact between an aqueous liquid medium and an organic hydrophobic liquid medium capable of undergoing mass transfer with the aqueous medium, comprising:
   a chamber for holding a body of each of the aqueous and organic liquid media;
   agitator means within the chamber for agitating the liquid media in a mixing zone so as to form a dispersion band which contains a dispersion of droplets of one of the media dispersed within the other, the droplets of dispersed medium being of a size such that upon standing under gravity the dispersion will substantially completely disengage into two separate liquid layers, the mixing zone being disposed within the chamber with a free space above and/or below it that is devoid of baffles such that an upper layer of disengaged lighter medium may form above the dispersion band whilst a layer of disengaged lower medium may form below the dispersion band with at least one of these layers extending at least partially into the corresponding free space and such that dispersion can freely re-enter the mixing zone;
   means for supplying at least one of the aqueous and organic liquid media to the mixing zone; and
   means for recovering from the chamber lighter and/or heavier medium from the upper and/or lower layer respectively at a rate in each case substantially equal to the rate of supply of that medium to the mixing zone.

8. Apparatus according to claim 7, in which means are provided for supplying both of the aqueous and organic liquid media to the mixing zone, each at a predetermined feed rate, and in which means are provided for recovering from the chamber both disengaged lighter medium and disengaged heavier medium from the upper and lower layer respectively, each at a rate substantially equal to the rate of supply of that medium to the mixing zone.

9. Apparatus according to claim 7 or claim 8, in which the means for recovering from the chamber lighter and/or heavier medium includes a respective weir over which the disengaged medium may flow.

10. Apparatus according to claim 7, in which there is a free space above or below the mixing zone and in which a baffle is positioned below or above the mixing zone respectively.

11. Apparatus according to claim 7, in which the agitator means comprises a double-shrouded pump-mix impeller with an open eye in its lower face and in which the means for supplying the medium or media to the mixing zone includes a draught tube having an open upper end positioned under and adjacent the open eye of the impeller.

12. An apparatus for effecting liquid-liquid contact between an aqueous medium and an organic hydrophobic liquid medium in accordance with claim 6, wherein said agitator means comprises a double-shrouded pump-mix impeller with an open eye in its lower face, and said means for supplying the medium or media to the mixing zone includes a draught tube having an open upper end positioned under and adjacent the open eye of the impeller.

13. Apparatus according to claim 7 wherein said rotating means comprises an impeller, and means for rotating the impeller in the mixing zone; and wherein said chamber defines the free space devoid of baffles such that free movement of liquid is permitted between at least one of the upper and lower layers and the impeller without substantially disturbing the separated state of the lighter or heavier medium in the one layer.

* * * * *